(12) United States Patent
Kim

(10) Patent No.: US 7,858,247 B2
(45) Date of Patent: Dec. 28, 2010

(54) HUMIDIFICATION SYSTEM FOR FUEL CELL

(75) Inventor: Hyun Yoo Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 49 days.

(21) Appl. No.: 12/218,811

(22) Filed: Jul. 17, 2008

(65) Prior Publication Data

US 2009/0226784 A1  Sep. 10, 2009

(30) Foreign Application Priority Data

Mar. 6, 2008  (KR)  ...................... 10-2008-0020787

(51) Int. Cl.
*H01M 8/04* (2006.01)
(52) U.S. Cl. ...................................... 429/413
(58) Field of Classification Search .................. 429/26, 429/413; 261/102, 104
See application file for complete search history.

(56) References Cited

U.S. PATENT DOCUMENTS 6,669,177 B2 * 12/2003 Shimanuki et al. ............ 261/96

FOREIGN PATENT DOCUMENTS

| JP | 2001-201121 | | 7/2001 |
| JP | 2002-075421 | | 3/2002 |
| JP | 2002-289228 | | 10/2002 |
| JP | 2002-289229 | | 10/2002 |
| JP | 2004209418 A | * | 7/2004 |
| KR | 10-2008-0001951 | | 1/2008 |

OTHER PUBLICATIONS

IPDL Machine Translation of the Detailed Description of JP 2004-209418A.*

* cited by examiner

*Primary Examiner*—Gregg Cantelmo
(74) *Attorney, Agent, or Firm*—Edwards Angell Palmer & Dodge LLP; Peter F. Corless

(57) ABSTRACT

The present invention provides a humidification system with membranes of different species, in which a material having a high humidification performance and capable of being swollen with water is arranged in the center of a hollow fiber membrane bundle disposed in a hollow fiber membrane module and a material that is not swollen with water is disposed on the outside thereof. Accordingly, using the humidification system of the invention, it is possible to provide the same level of humidification performance as the existing humidification system, manufacture the humidification system at low cost, and solve various problems such as a flooding phenomenon of a fuel cell stack and an increase in load on an air blower.

8 Claims, 6 Drawing Sheets

BEFORE ABSORBING WATER

HUMIDIFICATION MEMBRANE IS SWOLLEN AND BENT DUE TO ABSORPTION OF WATER, WHICH RESULTS IN AN INCREASE IN PRESSURE DROP IN HUMIDIFICATION SYSTEM

AFTER ABSORBING WATER

HUMIDIFICATION SYSTEM FOR FUEL CELL

CROSS-REFERENCE TO RELATED APPLICATION

This application claims under 35 U.S.C. §119(a) the benefit of Korean Patent Application No. 10-2008-0020787 filed Mar. 6, 2008, the entire contents of which are incorporated herein by reference.

BACKGROUND (a) Technical Field

The present invention relates to a humidification system for a fuel cell. More particularly, the present invention relates to a humidification system with membranes of different species, in which a material having a high humidification performance and capable of being swollen with water is arranged in the center of a hollow fiber membrane bundle disposed in a hollow fiber membrane module and a material that is not swollen with water is disposed on the outside thereof.

(b) Background Art

It can be necessary to humidify an electrolyte membrane in a fuel cell for the operation of the fuel cell, and thus a humidification system, in which water of exhaust gas, i.e., wet gas, discharged from the fuel cell is added to dry air supplied from the outside, is used.

Fuel cells can require a compact humidification system that occupies little space for mounting, and requires low power consumption. Humidification systems designed for satisfying such demands include various techniques such as ultrasonic humidification, steam humidification, and evaporative humidification, etc.; however, a humidification technique using a hollow fiber membrane is suitably used for the fuel cell.

FIG. 1 is a schematic diagram illustrating an air supply system of a fuel cell system.

As shown in FIG. 1, the air supply system of the fuel cell system includes a membrane humidifier 100, to which dry air is supplied from the outside by a blower 202 and through which exhaust gas discharged from a fuel cell stack 200 passes. Accordingly, the dry air supplied from the outside is humidified while the exhaust gas containing water passes through hollow fiber membranes.

FIG. 2 is a cross-sectional view showing a schematic configuration of a hollow fiber membrane humidifier.

As shown in FIG. 2, the humidifier 100 includes a housing 101 having a first inlet 102 for introducing dry air and a first outlet 103 for discharging dry air. Moreover, a hollow fiber membrane module 107 is provided in the housing 101, and a plurality of hollow fiber membranes 106 is placed in the hollow fiber membrane module 107.

The operation of the hollow fiber membrane humidifier 100 having the above configuration will be described below.

When exhaust gas, i.e., wet air, discharged from the fuel cell stack is supplied to the inside of the hollow fiber membrane module 107 through a second inlet 104 of the housing 101, water in the wet air is separated by capillary action of the respective hollow fiber membranes 106, and the separated water is condensed while passing through the capillaries of the hollow fiber membranes 106 and moved inside the hollow fiber membranes 106.

Subsequently, the air from which water is separated is transferred to the outside of the hollow fiber membranes 106 and discharged through a second outlet 105 of the housing 101.

Meanwhile, the outside air (dry air) is supplied through the first inlet 102 of the housing 101 by the operation of the blower and moved along the inside of the hollow fiber membranes 106. At this time, since the water separated from the wet air has been transferred to the inside of the hollow fiber membranes 106, the dry air is humidified by the water, and the thus humidified air is discharged to the fuel cell stack through the first outlet 103.

However, as shown in FIG. 2, since the hollow fiber membrane module 107 has a structure in which the plurality of hollow fiber membranes 106 is densely packed, it is difficult for the wet air introduced through the second inlet 104 to penetrate into the inside of the hollow fiber membrane module 107.

Moreover, since the wet air is diffused very slowly, the difficulty becomes more considerable.

For such reasons, in the hollow fiber membrane module 107 accommodated in the housing 101, the wet air passing through the outside of the hollow fiber membrane module 107 does not penetrate into the center of the hollow fiber membrane module 107 shown as a dotted line box in FIG. 2, but mainly flows along the edge of the hollow fiber membrane module 107 as shown with arrows in FIG. 2. As a result, the rate that the wet air penetrates into the inside of the hollow fiber membrane module 107 is very low, and thus the humidification efficiency is reduced.

Accordingly, the hollow fiber membranes 106 positioned in the vicinity of the center of the hollow fiber membrane module 107 are not supplied with sufficient water, and thus the overall efficiency of the humidification system may be reduced.

Moreover, in case of the conventional humidifier 100, since the dry air introduced through the first inlet 102 mainly flows through the center of the hollow fiber membrane module 107 (the portion shown as a dotted line box in FIG. 2), the overall humidification efficiency may be greatly reduced.

Such a problem is illustrated in the simulation test results of FIG. 3.

It can be clearly seen from FIG. 3 that most of the dry air flows only through the center of the hollow fiber membrane module 107.

In other words, since the dry air introduced through the first inlet 102 mainly flows through the center of the hollow fiber membrane module 107 (the portion shown as a dotted line box in FIG. 2) and the wet air introduced through the second inlet 104 flows along the edge of the hollow fiber membrane module 107, the overall humidification efficiency may be reduced.

Such a problem becomes more serious when the amount of dry air is increased, i.e., when the fuel cell stack provides a high output voltage.

Another problem of the conventional humidification system is caused by the hollow fiber membranes and the arrangement thereof.

Despite the advantage that the membrane humidifier is applicable for use with a vehicle, available hollow fiber membrane materials are very expensive, and thus it disadvantageous especially in terms of the manufacturing cost.

In the case of membrane humidifiers, a Nafion membrane is widely used as the hollow fiber membrane material applied to the fuel cell stack, more particularly, to a membrane electrode assembly (MEA), and thus it is disadvantageous in terms of cost reduction.

In most cases, sufficient humidification is required in a low current region of the fuel cell system, and much water is produced in high power and high current regions to the extent that a cathode does not require humidification. Nevertheless, most of the humidification systems known at present are operated without varying the amount of humidification in both the low and high current regions. Especially, in the case where only Nafion is used as the material for the hollow fiber membranes, a high humidity of more than 80% RH [what does the abbreviation RH stand for?] is provided even in the high current region.

Since a large amount of water is produced and a high humidity is provided in the high current region of the fuel cell system, an increase in resistance of cathode material transfer and a flooding phenomenon may occur, which results in air starvation of the cathode. As a result, the deterioration of the fuel cell catalyst is accelerated and thus the durability of the fuel cell is reduced.

Moreover, as shown in FIG. 4, in the case where the whole bundle of hollow fiber membranes 106, disposed in the hollow fiber membrane module 107 of the humidification system, is formed of NAFION, the bundle of hollow fiber membranes expands by absorbing water due to its characteristics, and the hollow fiber membrane itself is not stretched in the longitudinal direction thereof but rather bent in a zigzag shape due to the expansion, thus increasing pressure drop in the humidification system. As a result, the load applied on the air blower for supplying air to the humidification system is increased.

Similarly, in the case where only Nafion is used as the material for the hollow fiber membranes, there are numerous problems to be overcome.

The above information disclosed in the Background section is only for enhancement of understanding of the background of the invention and therefore it may contain information that does not form the prior art that is already known in this country to a person of ordinary skill in the art.

SUMMARY OF THE DISCLOSURE

In one aspect, the present invention is directed to a humidification system with membranes of different species, in which a material having a high humidification performance and capable of being swollen with water is arranged in the center of a hollow fiber membrane bundle disposed in a hollow fiber membrane module and a material that is not swollen with water is disposed on the outside thereof. Accordingly, such preferred systems of the invention can provide the same level of humidification performance as existing humidification systems, be manufactured at relatively low cost, and address various problems such as fuel cell stack flooding and increased air blower load.

In one embodiment, the present invention provides a humidification system for a fuel cell, the humidification system comprising: a hollow fiber membrane module; and a hollow fiber membrane bundle disposed therein, wherein a plurality of hollow fiber membranes that is readily swollen with water is arranged in the center of the hollow fiber membrane bundle through which dry air supplied from the outside by a blower mainly flows, and a plurality of hollow fiber membranes that is not swollen with water is disposed on the outside of the hollow fiber membrane bundle through which wet air discharged from a fuel cell stack mainly flows.

In a preferred embodiment, a plurality of hollow fiber membranes formed of a polymeric materials such as Nafion material suitably having a high humidification performance is preferably arranged in the center of the hollow fiber membrane bundle, and a plurality of hollow fiber membranes suitably formed of one selected from the group consisting of polyetherimide and polyphenylsulfone preferably having a relatively low humidification performance compared with that of the hollow fiber membrane formed of the Nafion material is disposed on the outside of the hollow fiber membrane bundle.

In another preferred embodiment, a packing density of the hollow fiber membranes disposed on the outside of the hollow fiber membrane bundle is higher than that of the hollow fiber membranes arranged in the center of the hollow fiber membrane bundle.

In still another preferred embodiment, the number of strips of the hollow fiber membranes disposed on the outside of the hollow fiber membrane bundle is greater than that of the hollow fiber membranes arranged in the center of the hollow fiber membrane bundle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

Figure 1:
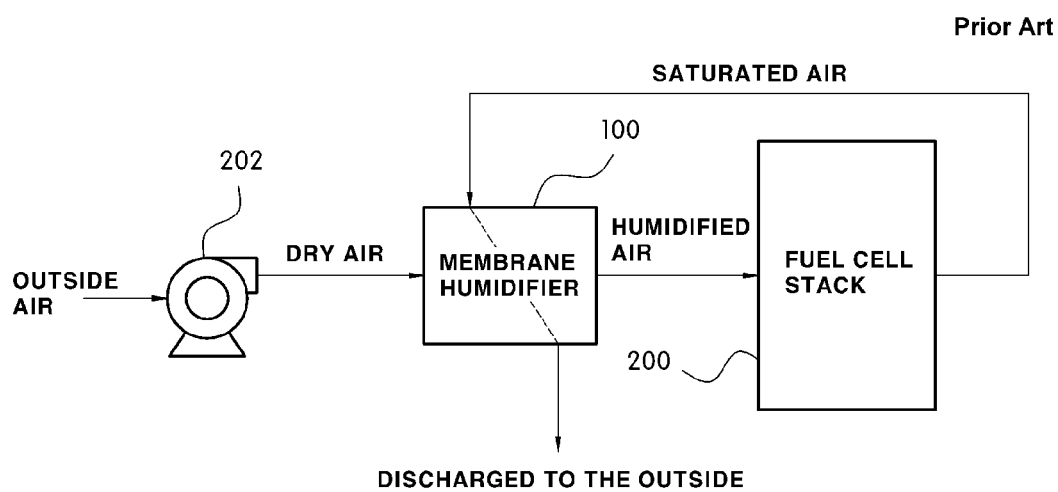
FIG. 1 is a schematic diagram illustrating an air supply system of a fuel cell system.
Figure 2:
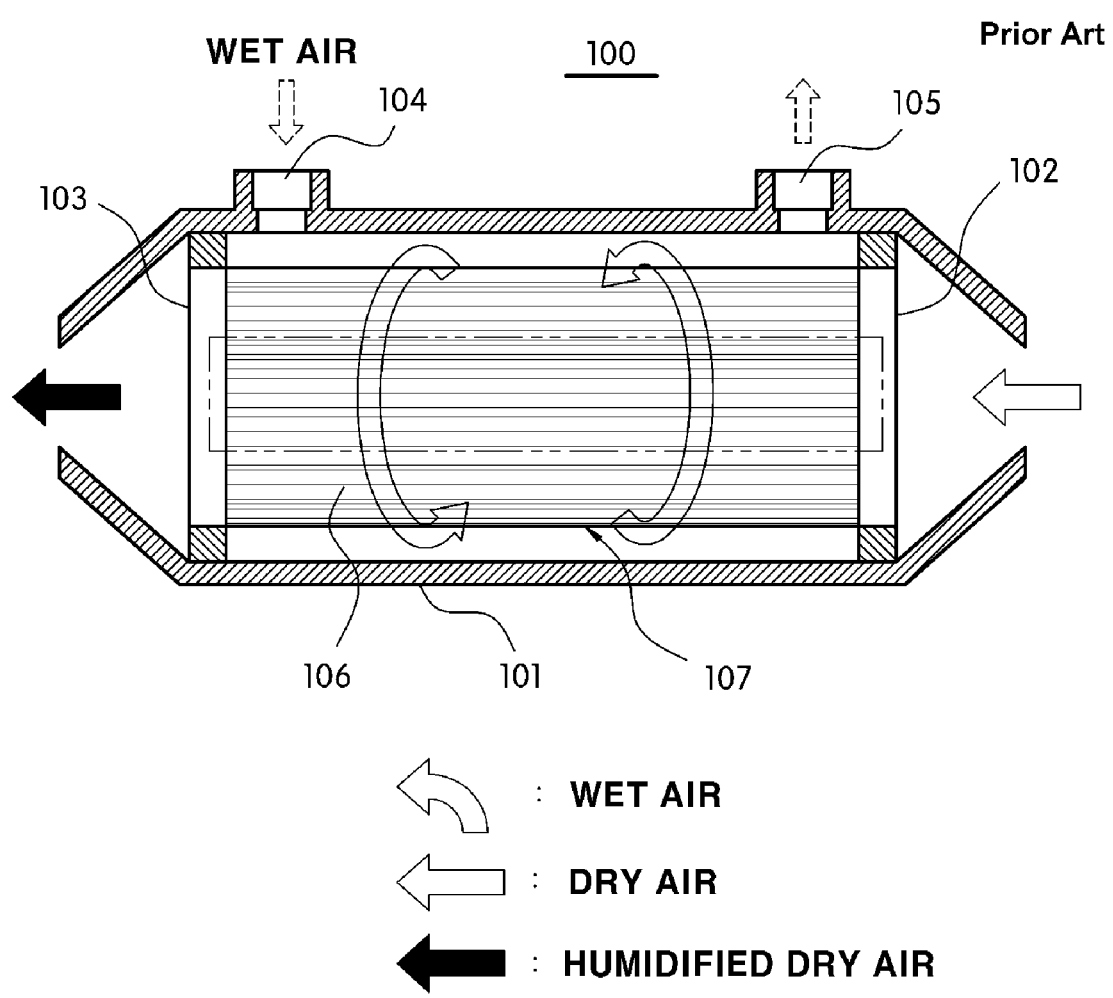
FIG. 2 is a schematic diagram illustrating the configuration and operation of a humidification system for a fuel cell.
Figure 3:
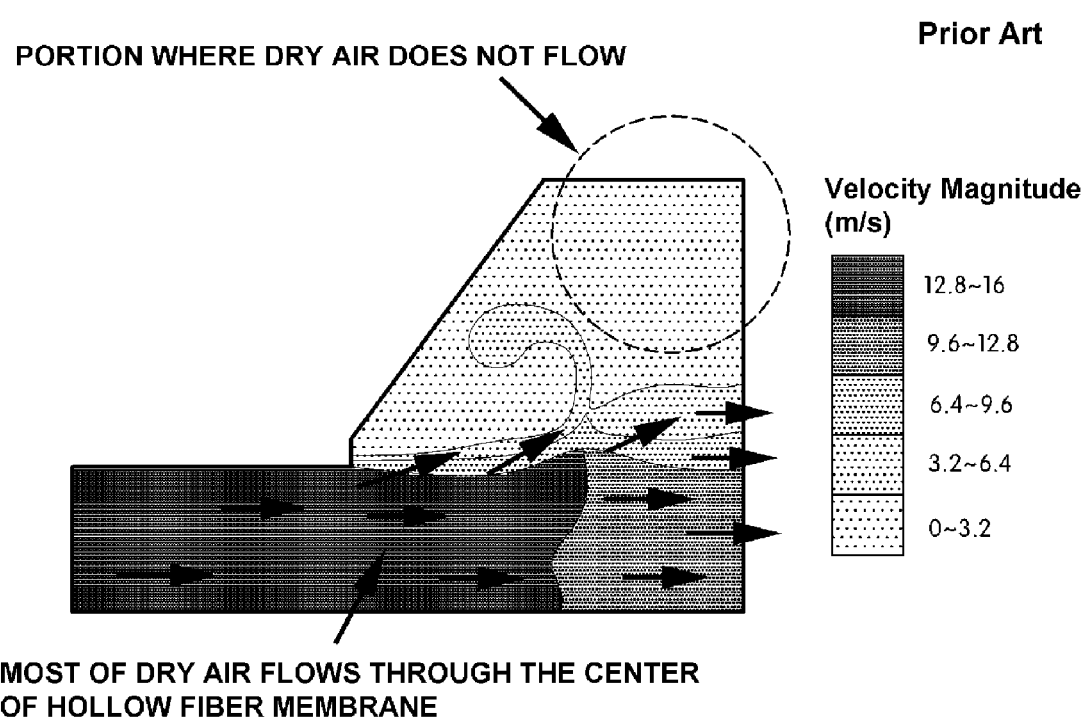
FIG. 3 shows simulation test results illustrating a problem of a conventional humidification system for a fuel cell.
Figure 4:
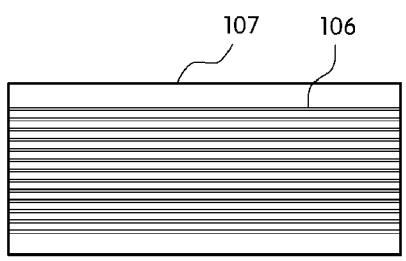
FIG. 4 is a schematic diagram illustrating another problem of the conventional humidification system of a fuel cell.
Figure 4:
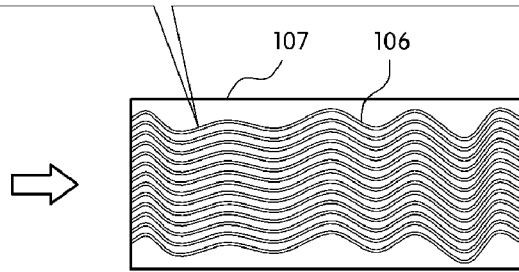

Reference numerals set forth in the Drawings includes reference to the following elements as further discussed below:

10: hollow fiber membrane module
11: first hollow fiber membrane
12: second hollow fiber membrane
100: humidifier
101: housing
102: first inlet
103: first outlet
104: second inlet
105: second outlet
106: hollow fiber membranes
107: hollow fiber membrane module
200: fuel cell stack
202: blower It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

As described herein, the present invention includes a humidification system for a fuel cell, where the humidification system comprises a hollow fiber membrane module and a hollow fiber membrane bundle disposed therein. In certain preferred embodiments, the humidification system further comprises a plurality of hollow fiber membranes that is swollen with water arranged in the center of the hollow fiber membrane bundle through which dry air supplied from the outside by a blower flows. In other preferred embodiments, the humidification system comprises a plurality of hollow fiber membranes that is not swollen with water disposed on the outside of the hollow fiber membrane bundle through which wet air discharged from a fuel cell stack mainly flows.

The invention can also include a motor vehicle comprising a fuel cell according to any of the embodiments as described herein.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

In general, a humidification system for a fuel cell includes a hollow fiber membrane module installed therein, and, in certain preferred embodiments, a plurality of hollow fiber membranes is provided in the form of a bundle in the hollow fiber membrane module, in which dry air supplied from the outside by the operation of a blower mainly flows through the center of the hollow fiber membrane bundle and wet air discharged from a fuel cell stack mainly flows along the edge of the hollow fiber membrane bundle.

Taking the above description into consideration, but not limited only to the description provided, preferred aspects of the present invention aim at resolving the above-mentioned problem while maintaining substantially the same or enhanced humidification performance of the existing humidification system by suitably arranging hollow fiber membranes of different species.

For a better understanding of the present invention, in consideration of the structure of the hollow fiber membrane bundle, in which hollow fiber membranes of different species are separately arranged, the following fiber membranes of different species will be classified into a first hollow fiber membrane and a second hollow fiber membrane.

Figure 5:
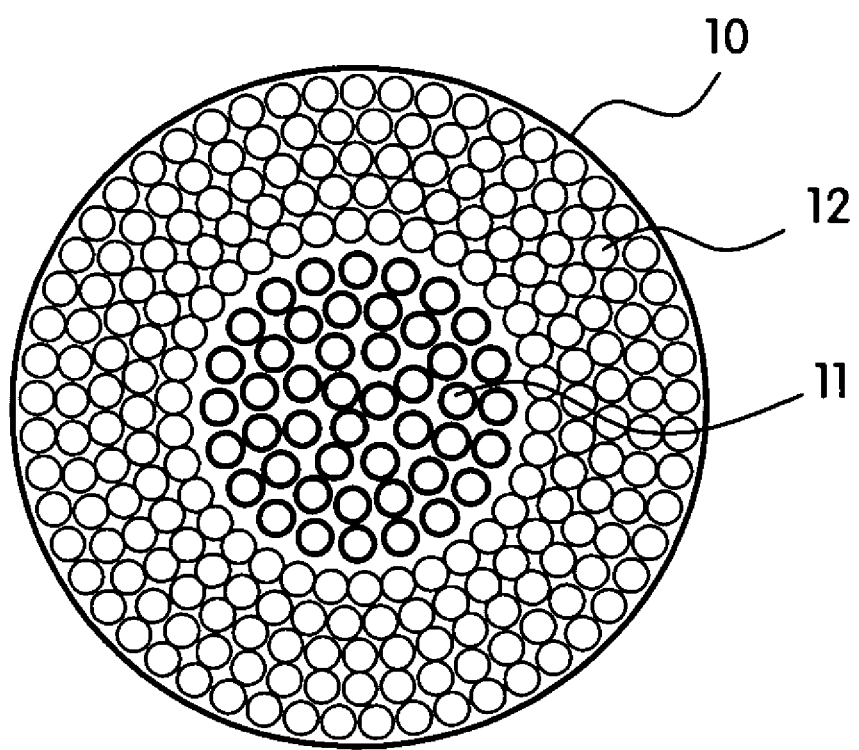
FIG. 5 is a schematic diagram illustrating the arrangement of first and second hollow fiber membranes in a humidification system for a fuel cell in accordance with the present invention.
Figure 6:
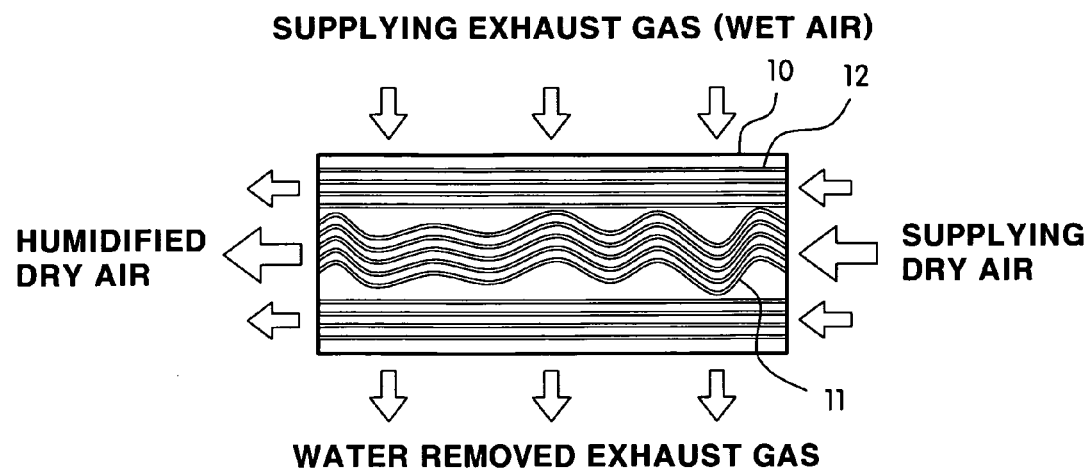
FIG. 6 is a schematic diagram illustrating the operation of the first and second hollow fiber membranes in the humidification system for a fuel cell in accordance with the present invention.

FIG. 5 is a schematic diagram illustrating a preferred arrangement of the first and second hollow fiber membranes in a humidification system for a fuel cell in accordance with the present invention, and FIG. 6 is a schematic diagram illustrating the operation of the first and second hollow fiber membranes in the humidification system for a fuel cell in accordance with the present invention.

In the arrangement of the hollow fiber membrane bundle disposed in a hollow fiber membrane module 10, the first hollow fiber membrane 11 having a high humidification performance and capable of being swollen with water is arranged in the center thereof, and the second hollow fiber membrane 12 that is not readily swollen with water is disposed on the outside thereof.

In particular, the first hollow fiber membrane 11 arranged in the center of the hollow fiber membrane bundle is formed of a material having a high humidification performance for dry air and capable of being swollen with water, for example but not limited to a Nafion material, and the second hollow fiber membrane 12 disposed on the outside of the first hollow fiber membrane 11 is formed of a material having a relatively low humidification performance, for example, but not limited to, polyetherimide or polyphenylsulfone, compared with that of the first hollow fiber membrane 11 formed of the Nafion material, and having a low expansion coefficient.

In certain examples, since the first hollow fiber membrane 11 formed of the Nafion material has a high humidification performance, it provides sufficient humidification performance even with a small amount of wet air, and thus it is arranged in the center of the hollow fiber membrane bundle.

In other words, exhaust gas, i.e., gas with a relatively large amount of wet air, introduced from the fuel cell stack into the hollow fiber membrane module 10 of the humidification system mainly flows along the edge of the hollow fiber membrane bundle; however, a small amount of the wet air also flows through the center of the hollow fiber membrane bundle, and thus the first hollow fiber membrane 11 formed of the Nafion material that readily absorbs water of the wet air is arranged in the center of the hollow fiber membrane bundle.

Accordingly, when the outside air, i.e., dry air, introduced into the fuel cell humidification system by the blower mainly flows through the first hollow fiber membrane 11 arranged in the center of the hollow fiber membrane bundle, the dry air is easily humidified by the water of the wet air penetrating through the first hollow fiber membrane 11.

On the contrary, since the second hollow fiber membrane 12 having a relatively low humidification performance compared with that of the first hollow fiber membrane 11 can show a high humidification performance only when the amount of the wet air is large, it is disposed on the outside of the hollow fiber membrane bundle.

Accordingly, since the exhaust gas, i.e., gas with a relatively large amount of wet air, introduced from the fuel cell stack into the hollow fiber membrane module 10 of the fuel cell humidification system mainly flows along the edge of the hollow fiber membrane bundle, it is thus possible to maintain the same humidification performance even though the second hollow fiber membrane 12 having a relative low humidification performance compared with that of the first hollow fiber membrane 11 is disposed on the outside of the hollow fiber membrane bundle.

Moreover, since the flow amount of the outside air, i.e., dry air, introduced into the fuel cell humidification system by the blower and flowing along the edge of the hollow fiber membrane bundle is relatively low compared with that flowing through the center thereof, it is possible to provide sufficient humidification performance for the dry air even though the second hollow fiber membrane 12 having a relative low humidification performance compared with that of the first hollow fiber membrane 11 is disposed on the outside of the hollow fiber membrane bundle.

As described above, the Nafion material is widely used as the hollow fiber membrane material in the fuel cell humidification system despite the high price; however, it has drawbacks in that since the water expansion rate is high, the hollow fiber membrane, i.e., the humidification membrane itself is bent in a zigzag shape due to the expansion, and thus the pressure drop in the humidification system increases, which results in an increase in load on the blower.

However, with the arrangement of the hollow fiber membrane bundle in accordance with the present invention, in which the first hollow fiber membrane 11 as may be suitably formed of the Nafion material is arranged in the center of the hollow fiber membrane bundle and the second hollow fiber membrane 12 as may be suitably formed of polyetherimide or polyphenylsulfone having a relatively low water expansion rate is disposed on the outside of the hollow fiber membrane bundle, the second hollow fiber membrane 12 suitably maintains the flat straight line shape, even though the first hollow fiber membrane 11 is bent in a zigzag shape, as shown in FIG. 6. Accordingly, it is possible to prevent or minimize an increase in pressure drop in the humidification system and an increase in load on the blower.

Moreover, as described above, there is a drawback in that, in case of the high power region where much water is produced due to the same humidification conditions as the low power region, the deterioration of the fuel cell catalyst is caused by the flooding phenomenon, thus reducing the durability of the fuel cell.

However, according to the present invention, it is possible to prevent or minimize the flooding phenomenon in the fuel cell stack by controlling the mixing ratio between the first hollow fiber membrane 11 formed of the Nafion material having a high humidification performance and the second hollow fiber membrane 12 having a relatively low humidification performance.

That is, in the event that the flooding phenomenon occurs wherein significant water is produced in the fuel cell stack, the mixing ratio of the second hollow fiber membrane 12 to the first hollow fiber membrane 11 is increased to prevent the flooding phenomenon.

In other words, when the packing density and the number of strips of the second hollow fiber membrane 12 in the hollow fiber membrane module 10 are higher than those of the first hollow fiber membrane 11, the amount of product water in the second hollow fiber membrane 12 is decreased due to the increased humidification performance of the second hollow fiber membrane 12, and thus the humidification of the dry air supplied to the fuel cell stack is reduced. As a result, it is possible to prevent or minimize the flooding phenomenon in the high power region where much water is produced in the fuel cell stack.

As described above, the present invention can provide the following effects.

In the arrangement of the hollow fiber membrane bundle for the fuel cell humidification system, the first hollow fiber membrane having a high humidification performance and capable of being swollen with water is arranged in the center of the hollow fiber membrane bundle and the second hollow fiber membrane having a relative low humidification performance compared with the first hollow fiber membrane and being not swollen with water is disposed on the outside of the hollow fiber membrane bundle such that it is possible to prevent or minimize an increase in pressure drop in the humidification system and an increase in load on the blower.

Moreover, in the arrangement of the hollow fiber membrane bundle for the fuel cell humidification system described herein, it is possible to prevent or minimize the flooding phenomenon in the high power region where a large amount of water is produced in the fuel cell stack.

Furthermore, with the arrangement of the hollow fiber membrane bundle, in which the high-priced Nafion material is used only as the material for the first hollow fiber membrane and the inexpensive polyetherimide or polyphenylsulfone is used as the material for the second hollow fiber membrane, it is possible to reduce the manufacturing cost.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A humidification system for a fuel cell, the humidification system comprising:
    a hollow fiber membrane module; and
    a hollow fiber membrane bundle disposed therein,
    wherein the hollow fiber membrane bundle includes a first hollow fiber membrane portion in a center portion thereof through which dry air supplied from outside by a blower mainly flows and a second hollow fiber membrane portion at a position surrounding the center portion thereof through which wet air discharged from a fuel cell stack mainly flows, the first hollow fiber membrane portion being capable of being readily swollen with water and the second hollow fiber membrane portion not being capable of being readily swollen with water,
    wherein the packing density of the hollow fiber membranes of the second hollow fiber membrane portion is higher than that of the hollow fiber membranes of the first hollow fiber membrane portion.

2. The humidification system of claim 1, wherein the first hollow fiber membrane portion includes a plurality of hollow fiber membranes formed of a sulfonated tetrafluoroethylene based fluoropolymer and the second hollow fiber membrane portion includes a plurality of hollow fiber membranes formed of one selected from the group consisting of polyetherimide and polyphenylsulfone.

3. The humidification system of claim 1 or 2, wherein the number of strips of the hollow fiber membranes of the second hollow fiber membrane portion is greater than that of the hollow fiber membranes of the first hollow fiber membrane portion.

4. A motor vehicle comprising the humidification system of claim 1.

5. A humidification system for a fuel cell, the humidification system comprising:
    a hollow fiber membrane module; and
    a hollow fiber membrane bundle disposed therein,
    wherein the hollow fiber membrane bundle includes a first hollow fiber membrane portion in a center portion thereof through which dry air supplied from the outside by a blower mainly flows and a second hollow fiber membrane portion at a position surrounding the center portion thereof through which wet air discharged from a fuel cell stack mainly flows, humidification performance of the first hollow fiber membrane portion being higher than that of the second hollow fiber membrane portion,
    wherein the packing density of the hollow fiber membranes of the second hollow fiber membrane portion is higher than that of the hollow fiber membranes of the first hollow fiber membrane portion.

6. The humidification system of claim 5, wherein the first hollow fiber membrane portion includes a plurality of hollow fiber membranes.

7. The humidification system of claim 5, wherein the second hollow fiber membrane portion includes a plurality of hollow fiber.

8. A motor vehicle comprising the humidification system of claim 5.

* * * * *